3,372,148
TEREPHTHALIC ACID-ALIPHATIC ACID COPOLYESTER RESINS
Maria V. Wiener, Akron, Ohio, assignor to The Goodyear Tire & Rubber Company, Akron, Ohio, a corporation of Ohio
No Drawing. Filed Feb. 12, 1963, Ser. No. 257,861
5 Claims. (Cl. 260—75)

This invention relates to new copolyester resins. More particularly the invention relates to copolyester resin adhesives and to products made therefrom.

Polymeric ethylene terephthalate is an easily crystallizable material. In fact, it crystallizes so readily that it must be treated under special conditions to obtain it in the amorphous state. Polymeric ethylene sebacate is also an easily crystallizable material that crystallizes quite rapidly when hot. Similarly neopentyl terephthalate and neopentyl sebacate are easily crystallized. Copolyesters of ethylene terephthalate sebacate and copolyesters of neopentyl terephthalate sebacate are also readily crystallizable materials.

If it is attempted to use one of these materials as an adhesive, for example as a melt adhesive, it is found that it crystallizes too rapidly and to too great an extent to be an effective adhesive. Furthermore, since the crystallinity which develops in such a case is random or unoriented crystallinity, laminates made with these materials have inferior properties because the adhesive is randomly crystallized and does not develop suitable tensile properties. In addition, most of the adhesive character that such resins may have had in the uncrystallized state is diminished or completely lost when these resins crystallize. The loss in adhesiveness in such materials is about in proportion to the amount of crystallinity developed.

It has also been found that when these materials are used in mixtures with each other they suffer the same disadvantages. Mixtures crystallize as do the original polyesters alone and because of this mixtures of the above polyester resins are not suitable for use as adhesives.

It is an object of this invention to prepare linear copolyester resins which are suitable for use in adhesive applications. Another object of the invention is to produce copolyester resins which have little or no tendency to crystallize and which exhibit outstanding adhesiveness to various surfaces. Other objects of the invention will appear hereinafter as the description of the invention proceeds.

According to the invention copolyesters of ethylene glycol, neopentyl glycol, terephthalic acid and an aliphatic dicarboxylic acid having the formula $$HOOC-(CX_2)_n COOH$$

in which X is at least one member selected from the group consisting of hydrogen and alkyl radicals containing from one to four carbon atoms and $n$ is a positive integer, at least 6 in which the molar ratio of ethylene glycol units to neopentyl glycol units in the copolyester is in the range of from 70/30 to 30/70 and the aliphatic dicarboxylic acid comprises from 5 to 30 mol percent of the total mols of acid component in the copolyesters have little tendency to crystallize and are generally amorphous materials that have a high affinity for various surfaces and are highly useful as adhesive compositions.

The new copolyesters of the invention may be made according to the following example.

*Example 1*

20.6 grams of neopentyl glycol; 28.7 grams of ethylene glycol; 40.6 grams of dimethyl terephthalate; 0.017 gram of antimony trioxide and 0.017 gram of zinc acetate were placed in a small glass reaction vessel which was equipped with a stirrer, a nitrogen inlet tube and a sidearm. The glass reaction vessel was heated at 217° C. by means of a vapor bath and nitrogen gas was slowly passed over the reaction mixture. The mixture was heated until the alcoholysis reaction was essentially complete. 18.2 grams of sebacic acid were added to this mixture and a vapor bath having a temperature of 245° C. was used to heat the vessel. The pressure in the reaction vessel was slowly decreased to 120 millimeters of mercury pressure over a period of 30 minutes while the excess glycol and water formed in the reaction were distilled out. The mixture was heated for an additional 30 minutes at 245° C. and 120 millimeters of mercury pressure to insure completion of the reaction with the sebacic acid. Then the pressure in the system was reduced to 0.5 millimeter of mercury pressure and the vapor bath was replaced by another having a temperature of 280° C. The mixture was heated at 280° C. and 0.5 millimeter of mercury pressure for one hour and 15 minutes. The copolyester formed had an intrinsic viscosity of 0.82.

In preparing the copolyester resins it was found that the glycols do not enter the polymer chain in exactly the same ratio in which they were charged into the reactor. Due to differences in volatility and reactivity of the glycols and to the use of amounts of the glycols in excess of the amount required to combine with the acid components or for some other reason the ratio of ethylene glycol units to neopentyl glycol units bound in the polymer chain is found to be different from the ratio of the two glycols charged into the reaction vessel. The acid units, however, will be incorporated in the copolyester in about the same ratio in which the acids are charged into the reaction vessel. For example in the reaction system used it was found that if the molar ratio of ethylene glycol to neopentyl glycol charged is 70:30 and the molar ratio of terephthalic acid to sebacic acid charged is 70:30 copolyester resin formed contained ethylene glycol units and neopentyl glycol units in the ratio of 55:45 and terephthalic acid units to sebacic acid units in the ratio of 70:30. Similarly, where the ratio of ethylene glycol to neopentyl glycol charged was 80:20 and the molar ratio of terephthalic acid to sebacic acid was 80:20 the copolyester resin formed contained ethylene glycol units and neopentyl glycol units in the ratio of 65:35 and terephthalic acid units to sebacic acid units in the ratio of 80:20. The term glycol unit as used in this specification means the glycol having H removed from the OH group of the glycol. The term acid unit means the carboxylic acid having OH removed from the carboxyl group of the acid.

The invention provides a series of copolyester resins in which the properties can be adjusted by regulating the ratios of the components in the copolyester. This is illustrated in the data in the following table which shows some physical property data for copolyesters which contain the same ethylene glycol, neopentyl glycol ratio but different ratios of terephthalic acid and sebacic acid.

TABLE 1

| Resin Composition, EN-TS [1] | Tensile strength, pounds per square inch | Elongation, percent | Shore D Hardness at 77° F. | Softening Point, F.[2] |
|---|---|---|---|---|
| 60/40-95/5 | 7,250 | 2-4 | 80 | 325 |
| 60/40-90/10 | 8,100 | 2-4 | 76 | 323 |
| 60/40-85/15 | 6,700 | 2-4 | 68 | 300 |

[1] E means ethylene glycol unit, N means neopentyl glycol unit, T means terephthalic acid unit, S means sebacic acid unit.
[2] Ring and Ball Softening Point Test.

Resin contained 3.8 parts TiO₂, 1.2 parts chrome oxide, trace carbon black.

The copolyesters of the invention are resins in which ethylene glycol units are present in the amount of from 70 to 30 mol percent of the total number of mols of acid component in the copolyester, the neopentyl glycol units are present in the corresponding amount of from 30 to 70 mol percent of the total number of mols of acid component and in which the molar ratio of terephthalic acid units to aliphatic dicarboxylic acid units is from 95:5 to 70:30. Preferred copolyesters are the copolyesters which contain ethylene glycol units in the amount of from 60 to 40 mol percent of the total number of mols of acid component, neopentyl glycol units in the corresponding amount of from 40 to 60 mol percent of the total number of mols of acid component and the molar ratio of terephthalic acid to aliphatic dicarboxylic acid of from 90:10 to 70:30. The preferred copolyesters are the ethylene glycol neopentyl glycol terephthalate sebacate copolyesters which contain ethylene glycol units in the amount of from 60 to 40 mol percent of the total number of mols of terephthalic acid and sebacic acid in the copolyester, neopentyl glycol units in the corresponding amount of from 40 to 60 mol percent and terephthalic acid units and sebacic acid units in the molar ratio of from 90:10 to 70:30.

The copolyester resins of the invention are soluble in common organic solvents. Solvents which have been found to give clear solutions of 25 percent concentration for 55/45 ethylene glycol neopentyl glycol-70/30 terephthalate sebacate copolyester resins are dioxane, tetrahydrofurane, 50/50 methyl ethyl ketone-toluol mixture, 30/40/30 acetone-toluol-xylol mixture and cyclohexanone. Solvents which give solutions which are clear initially but in which gel forms on standing are methyl ethyl ketone, pentoxane, methyl isobutyl ketone, 25/75 Cellosolve-xylol mixture, Cellosolve acetate, 2-nitropropane, ethyl acetate, N-butyl acetate and toluol.

The copolyesters are excellent adhesives and can be used to laminate various different materials. The following examples illustrate a use of the resins in adhesive applications.

Example 2

A solution of 30 parts of ethylene neopentyl terephthalate sebacate 55/45/70/30 in 100 parts methyl ethyl ketone/toluol/xylol (28/30/42) mixed solvent was coated on asbestos paper. The solvent was removed by drying for ten minutes at 200° F. Samples of the coated asbestos paper were laminated to annealed aluminum sheet by placing the copolyester resin coated side of the asbestos paper against the aluminum and heating and pressing the two together in a platen press at 325° F. and 100 pounds per square inch pressure and then cooling the composite article. The asbestos paper adhered very tightly to the aluminum sheet. The asbestos paper was also laminated to fiber glass in the same way. Excellent adhesion of the asbestos paper to the fiber glass was obtained.

Example 3

A laminate of a sheet of stainless steel and a sheet of zinc coated steel was prepared by heating and pressing the two sheets together at 300 to 350° F. at 100 pounds per square inch pressure using a layer of ethylene neopentyl terephthalate sebacate 55/45/70/30 as adhesive between the two sheets. The stainless steel adhered very tightly to the zinc coated steel and an excellent laminate was obtained.

Other materials can be laminated using a film of a copolyester of the invention as the adhesive at pressures of up to 20,000 pounds platen pressure at temperatures of 350 to 370° F. The copolyesters of the invention adhere strongly to various substances and are excellent laminating agents for materials such as glass, leather, wood, paper, other plastic materials such as polyester, vinyl resins, alkyd resins, etc. and metals, particularly iron, steel, chromium, aluminum and copper. The copolyesters of the invention are especially useful in melt adhesive applications in which the copolyester in molten state is inserted between two surfaces to be laminated and the composite article is pressed to insure contact between the surfaces and the molten adhesive. The copolyesters of the invention are also conveniently used in adhesive applications by coating a base to which it is desired to laminate a second layer with a solution of copolyester resin, evaporating the solvent and then applying the second layer to the coated side of the base and heating and pressing the composite article. The resins can also be used to prepare laminates by inserting a dry film of resin between two layers and heating and pressing them together.

The new copolyester resins are very difficult to crystallize for they crystallize very slowly and only a very low degree of crystallinity can be induced in them even on exposure to extended heating periods. These new materials are high molecular weight random linear copolyester resins.

The example illustrates the preparation of the copolyesters starting with the dimethyl ester of terephthalic acid, preparing the glycol terephthalates, then adding the sebacic acid and reacting it with the glycol esters and glycol. Other esters of the terephthalic acid such as the ethyl, propyl, butyl, amyl and phenyl esters can also be used. Other aliphatic dicarboxylic acids can be used in place of sebacic acid. Acids that can be used are aliphatic dicarboxylic acids having the formula $$HOOC(CX_2)_nCOOH$$

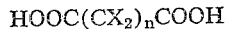

in which X is at least one member selected from the group consisting of hydrogen and alkyl radicals containing from one to four carbon atoms and $n$ is a positive integer not less than six. Representative examples of such acids are sebacic acid, azelaic acid, dodecanedioic acid, $\alpha$-methyl sebacic acid, $\alpha,\alpha'$-dimethyl sebacic acid and $\alpha$-butyl sebacic acid. The polyesters can also be prepared by placing the terephthalate esters, the aliphatic dicarboxylic acid esters and the glycol in the reaction vessel and reacting them. If desired, they can be prepared by reacting the bis glycol esters of the acids and the free higher-boiling diols or by reacting oligomers or low polymers of these materials in suitable proportions. In the latter instance longer total reaction times are required for complete randomization and, because of the extended reaction time, the polyesters produced are somewhat darker in color than are the copolyesters prepared starting with all of the materials in the monomeric form. The preferred method is to start with all of the glycols and bis terephthalate ester, prepare the glycol terephthalates by reacting them and then add the aliphatic dicarboxylic acid, react it and condense the mixture to the desired polymerization degree.

The reactions are carried out according to the general techniques used for preparing high molecular weight linear polyesters. Thus the ester interchange reaction is carried out at atmospheric pressure at a temperature from about 150 to 220° C. The polymerization reaction is carried out at pressures below 15 and preferably below one millimeter of mercury pressure at temperatures from 220 to 280° C.

The copolyesters are especially useful in coating applications and when in finely divided state and especially when pigmented are well adapted for use in fluidized bed coating applications. The copolyesters of the invention are also useful in flame spray and melt coating applications and in solution applications. The copolyesters are particularly useful as adhesives, and when so used they may be used as melt adhesives as discussed above or as dry adhesives by using preformed films as well as solution adhesives.

The copolyesters used as adhesives and sealants are high molecular weight materials. Thus the copolyesters will have an intrinsic viscosity of at least 0.20 and usually such copolyesters will have an intrinsic viscosity of at least 0.3.

Representative examples of solvents in which the polyesters are soluble are toluene, xylene, methyl ethyl ketone, methyl isobutyl ketone, cyclohexanone, dioxane, nitro paraffins such as 2-nitro propane, and chlorinated solvents such as tetrachloroethane, trichloroethane, ethylene dichloride and chloroform. Mixtures of solvents can also be used and in some instances mixtures of the aromatic solvents such as toluene and xylene with a ketone such as methyl ethyl ketone are preferred to either of the two materials alone.

While the polyesters will generally be used without further compounding they can be compounded with other materials if desired. Compatible resins, pigments, flatting agents, dyes, plasticizers and other compounding ingredients can be added either by mixing the materials together on a suitable mill or other mixing apparatus or by mixing in such compounding ingredients in solutions of the polyesters in a solvent.

As set out above, the copolyesters of the invention can be used in adhesive applications in the form of dry films. The films can be used as self-supporting films in packaging applications, coating applications, etc. as well as for laminating and adhesive applications. Films of the resins can be prepared by casting a layer of solution of resin in a solvent on a suitable surface such as a stainless steel belt, evaporating the solvent and removing the film from the surface. Films can also be made by extrusion of the molten resin through a slit die onto a cold surface and then removing the film from the surface. In this process granules of resin are fed into a screw extrusion apparatus, melted and extruded through a die at a temperature of from about 350 to about 400° F. onto a cold steel roll where it solidifies and then is led from the cold roll to a wind up apparatus where it is rolled up in a roll. The ethylene glycol, neopentyl glycol terephthalate-sebacate copolyesters are the preferred copolyesters for use as films. The copolyesters containing from 60 to 40 mol percent of ethylene glycol to 40 to 60 mol percent of neopentyl glycol, based on the total number of mols of acid component in the copolyester, the terephthalic acid component comprises 90 to 70 mol percent of the total number of mols of acid component and the sebacic acid correspondingly comprises from 10 to 30 mol percent of the total number of mols of acid component in the copolyester are especially useful as films.

While certain representative embodiments and details have been shown for the purpose of illustrating the invention it will be apparent to those skilled in this art that various changes and modifications may be made therein without departing from the spirit or scope of the invention.

I claim:

1. A random ethylene glycol-neopentyl glycol terephthlate-aliphatic dicarboxylate copolyester in which the aliphatic dicarboxylate units are derived from an aliphatic dicarboxylic acid having the general formula $$HOOC(CX_2)_nCOOH$$

in which X is at least one member selected from the group consisting of hydrogen and alkyl radicals containing from one to four carbon atoms and $n$ is a positive integer not less than six, in which the glycol units in said copolyester consist essentially of units of ethylene glycol and neopentyl glycol, said ethylene glycol units constituting from 70 to 30 mol percent of the total number of mols of acid component in the copolyester, the neopentyl glycol units correspondingly constituting from 30 to 70 mol percent of the total number of mols of acid component in the copolyester, the terephthalic acid units comprise from 95 to 70 mol percent of the total number of mols of terephthalic acid and aliphatic dicarboxylic acid component in the copolyester and the aliphatic dicarboxylic acid units comprise from 5 to 30 mol percent of the total mols of terephthalic and aliphatic dicarboxylic acid component in the copolyester.

2. A random ethylene glycol-neopentyl glycol-terephthalate-sebacate copolyester in which the glycol units in said copolyester consist essentially of units of ethylene glycol and neopentyl glycol, said ethylene glycol units constituting from 70 to 30 mol percent of the total number of mols of acid component in the copolyester, the neopentyl glycol units correspondingly constituting from 30 to 70 mol percent of the total number of mols of acid component in the copolyester, the terephthalic acid units comprise from 95 to 70 mol percent of the total number of mols of terephthalic and sebacic acid component in the copolyester and the sebacic acid units comprise from 5 to 30 mol percent of the total number of mols of terephthalic and sebacic acid component in the copolyester.

3. A random ethylene glycol neopentyl glycol terephthalate sebacate copolyester composition in which the glycol units in said copolyester consist essentially of units of ethylene glycol and neopentyl glycol, said ethylene glycol units constituting 55 mol percent of the total number of mols of terephthalic acid and sebacic acid component in the copolyester, the neopentyl glycol units correspondingly constituting 45 mol percent of the total number of mols of terephthalic acid and sebacic acid component in the copolyester, the terephthalic acid units comprise 70 mol percent of the total number of mols of terephthalic and sebacic acid component in the copolyester and the sebacic acid units comprise 30 mol percent of the total mols of terephthalic and sebacic acid component in the copolyester.

4. A random ethylene glycol-neopentyl glycol-terephthalate azelate copolyester in which the glycol units in said copolyester consist essentially of units of ethylene glycol and neopentyl glycol, said ethylene glycol units constituting from 70 to 30 mol percent of the total number of mols of acid component in the copolyester, the neopentyl glycol units correspondingly constituting 30 to 70 mol percent of the total number of mols of acid component in the copolyester, the terephthalic acid units comprise from 95 to 70 mol percent of the total number of mols of the terephthalic acid and azelaic acid component in the copolyester, the azelaic acid units comprise from 10 to 30 mol percent of the total number of mols of terephthalic acid and azelaic acid component in the copolyester.

5. A laminate comprising at least one layer of leather laminated to a second layer by means of an intermediate layer of the copolyester of claim 1.

References Cited

UNITED STATES PATENTS

| | | | |
|---|---|---|---|
| 3,013,914 | 12/1961 | Willard | 260—75 XR |
| 2,683,100 | 7/1954 | Edgar | 260—75 |
| 3,054,703 | 9/1962 | Brasure | 260—75 |
| 3,136,677 | 6/1964 | Woker | 260—75 |

WILLIAM H. SHORT, *Primary Examiner.*

LOUISE P. QUAST, SAMUEL H. BLECH,
*Examiners.*

C. A. WENDEL, *Assistant Examiner.*